(12) United States Patent
Shinohara et al.

(10) Patent No.: US 9,726,305 B2
(45) Date of Patent: Aug. 8, 2017

(54) ELECTRIC RESISTANCE WELDED STEEL PIPE

(71) Applicant: NIPPON STEEL & SUMITOMO METAL CORPORATION, Tokyo (JP)

(72) Inventors: Yasuhiro Shinohara, Tokyo (JP); Kensuke Nagai, Tokyo (JP); Masakazu Ozaki, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 296 days.

(21) Appl. No.: 14/420,971

(22) PCT Filed: Sep. 27, 2013

(86) PCT No.: PCT/JP2013/076422
§ 371 (c)(1),
(2) Date: Feb. 11, 2015

(87) PCT Pub. No.: WO2014/051119
PCT Pub. Date: Apr. 3, 2014

(65) Prior Publication Data
US 2015/0219249 A1    Aug. 6, 2015

(30) Foreign Application Priority Data

Sep. 27, 2012  (JP) ................... 2012-213725

(51) Int. Cl.
C22C 38/04     (2006.01)
C22C 38/14     (2006.01)
(Continued)

(52) U.S. Cl.
CPC .............. F16L 9/02 (2013.01); B23K 11/002 (2013.01); B23K 11/0873 (2013.01);
(Continued)

(58) Field of Classification Search
None
See application file for complete search history.

(56) References Cited

U.S. PATENT DOCUMENTS

2008/0286504 A1    11/2008  Asahi et al.
2013/0118632 A1     5/2013  Sawamura et al.

FOREIGN PATENT DOCUMENTS

EP    2 692 875 A1    2/2014
JP    5-105952 A      4/1993
(Continued)

OTHER PUBLICATIONS

Machine-English translation of Japanese patent 10-176239, Kashima Takahiro et al., Jun. 30, 1998.*
(Continued)

*Primary Examiner* — Doborah Yee
(74) *Attorney, Agent, or Firm* — Birch, Stewart, Kolasch & Birch, LLP

(57) ABSTRACT

An electric resistance welded steel pipe which has sufficient strength and low-temperature toughness and a low yield ratio and which is suitable as a line pipe to be laid in depths of the sea, characterized in that: the composition of the base material contains, in mass %, 0.05 to 0.10% of C, 1.00 to 1.60% of Mn, and 0.005 to less than 0.035% of Nb, and has a Ceq value of 0.23 to 0.38; and the metal microstructure of the base material contains 3 to 13% of martensite in area fraction with the balance being ferrite.

12 Claims, 2 Drawing Sheets

(51) Int. Cl.
    *C22C 38/12*     (2006.01)
    *C22C 38/02*     (2006.01)
    *C21D 8/10*     (2006.01)
    *C21D 9/14*     (2006.01)
    *F16L 9/02*     (2006.01)
    *C22C 38/00*     (2006.01)
    *C22C 38/06*     (2006.01)
    *C22C 38/08*     (2006.01)
    *C22C 38/16*     (2006.01)
    *C22C 38/18*     (2006.01)
    *B23K 35/38*     (2006.01)
    *B23K 11/087*     (2006.01)
    *C21D 9/50*     (2006.01)
    *B23K 11/00*     (2006.01)
    *C22C 38/26*     (2006.01)
    *C22C 38/28*     (2006.01)
    *C21D 9/46*     (2006.01)

(52) U.S. Cl.
    CPC ............... *B23K 35/38* (2013.01); *C21D 9/50* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/26* (2013.01); *C22C 38/28* (2013.01); *C21D 9/46* (2013.01); *C21D 2211/005* (2013.01); *C21D 2211/008* (2013.01); *Y10T 428/12292* (2015.01)

(56) References Cited

FOREIGN PATENT DOCUMENTS

| | | |
|---|---|---|
| JP | 9-49050 A | 2/1997 |
| JP | 10-176239 A | 6/1998 |
| JP | 2008-111162 A | 5/2008 |
| WO | WO 2005/080621 A1 | 9/2005 |
| WO | WO 2012/008486 A1 | 1/2012 |
| WO | WO 2012/133558 A1 | 10/2012 |

OTHER PUBLICATIONS

International Search Report, issued in PCT/JP2013/076422, dated Dec. 3, 2013.

\* cited by examiner

FIG. 2
(a) 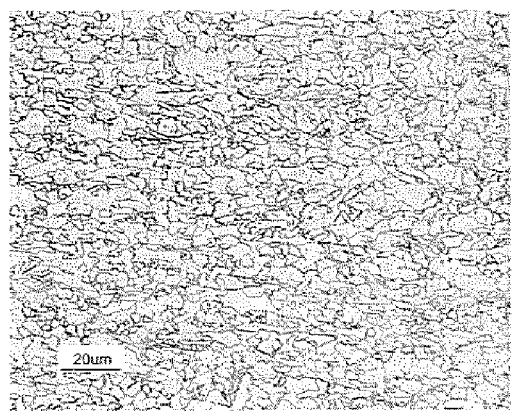 (b) 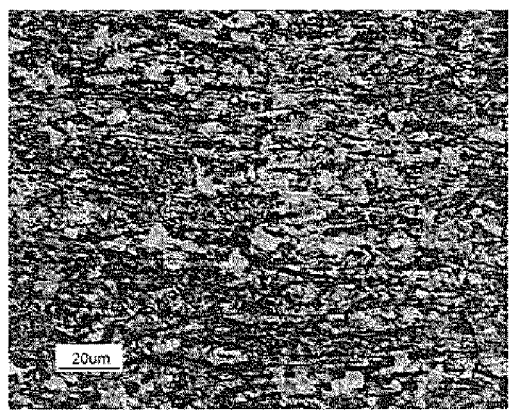
FIG. 3
(a) 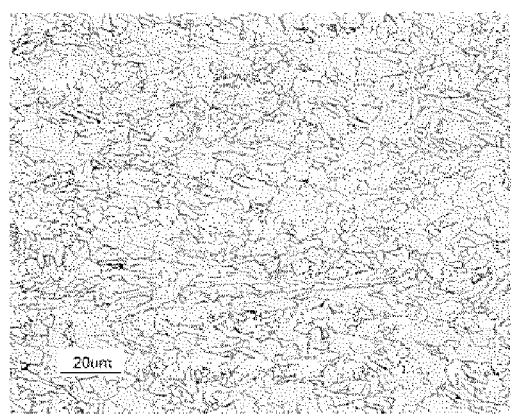 (b) 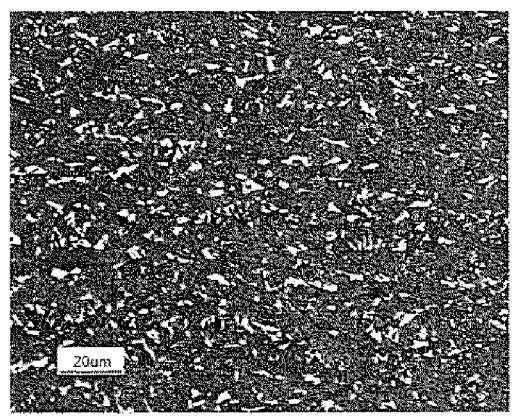

ELECTRIC RESISTANCE WELDED STEEL PIPE

TECHNICAL FIELD

The present invention relates to electric resistance welded pipe which is excellent in low temperature toughness and low in yield ratio which is optimal for applications such as line pipe for transport of oil, natural gas, etc.

BACKGROUND ART

In pipelines for transporting oil and natural gas over long distances, improvements are being made in the efficiency of transport by increasing pressures and the pipelines are being laid in deeper seas. For this reason, the electric resistance welded pipe which is used for the pipelines is being required to be made thicker and higher in strength. Further, when laying pipelines in deeper seas, the electric resistance welded pipe is sometimes subjected to repeated bending and unbending, so a lower yield ratio is demanded to prevent buckling.

If electric resistance welded pipe becomes thicker, the processing strain which is introduced when producing electric resistance welded pipe from hot rolled steel plate becomes larger. For this reason, a rise in yield ratio becomes harder to suppress. The yield ratio is an indicator of the durability when stress larger than the yield stress is applied to the material and therefore the material yields, then buckles or breaks. The lower the yield ratio, the harder it is for the steel pipe to buckle. The yield ratio (below, also referred to as "YR") is a value which is expressed by the ratio (YS/TS) of the yield stress (below, also referred to as "YS") and tensile strength (below, also referred to as "TS").

In general, it is known that if making the metal microstructure of the steel material a dual phase microstructure comprised of soft phases and hard phases, the YR falls. Electric resistance welded pipe with a base material of a metal microstructure which is made a dual phase microstructure has been proposed.

PLT 1 discloses low yield ratio electric resistance welded pipe where second phases constituted by island shaped martensite and retained austenite are formed. PLT 2 discloses low yield ratio hot rolled steel plate to be used as a material for line pipe which is produced by spiral pipemaking or UO pipemaking.

CITATIONS LIST

Patent Literature

PLT 1. Japanese Patent Publication No. 5-105952A
PLT 2. Japanese Patent Publication No. 10-176239A

SUMMARY OF INVENTION

Technical Problem

If electric resistance welded pipe becomes thicker in base material and smaller in outside diameter, the processing strain which is introduced when forming the steel plate or steel strip into a tube becomes larger, so it becomes difficult to maintain a low yield ratio after pipemaking. In particular, when producing electric resistance welded pipe with a level of strength of the X60 class (tensile strength 520 MPa or more) by the standards of the American Petroleum Institute (API) and with a ratio t/D of the thickness "t" and the outside diameter D in the state as formed, it was difficult to maintain the yield ratio at 90% or less.

Further, to lower the yield ratio, it is necessary to make the microstructure a dual phase microstructure comprised of soft phases and hard phases, but with a dual phase microstructure comprised of ferrite and martensite, low temperature toughness is difficult to secure. However, electric resistance welded pipe which is used for pipelines is required to be lowered in yield ratio and also be improved in toughness. Electric resistance welded pipe in which both of these characteristics are provided is demanded.

The present invention was made in consideration of such a situation and provides a thick electric resistance welded pipe which can maintain a low yield ratio even when just formed and a method of production of the same.

Solution to Problem

In conventional electric resistance welded pipe which has a dual phase microstructure, Nb is added and NbC is made to precipitate in the ferrite so as to secure the strength. However, the inventors discovered as a result of studies that addition of a large amount of Nb raises the yield stress of the material of the steel pipe of the hot rolled steel plate and as a result it becomes difficult to lower the yield ratio after pipemaking. Therefore, the inventors studied how to increase the strength and lower the yield ratio by the hard phases of the second phases without using precipitation strengthening.

Dual phase steel is work hardened by introduction of dislocations into the soft phases around the hard phases during plastic deformation. For this reason, if suppressing deformation of the hard phases, buildup of dislocations at the soft phases is promoted and the work hardening rate can be raised. Therefore, ferrite-martensite dual phase steel becomes higher in work hardening rate of ferrite and the steel plate and steel pipe are improved more in work hardening characteristics the harder the second phases of martensite (hard phases).

After hot rolling the steel, the steel can be cooled down to room temperature by accelerated cooling so as to suppress pearlite transformation or bainite transformation and form hard martensite (hard phases). On the other hand, if, after cooling, the microstructure does not transform to martensite and the hard phases include retained austenite, the work hardening characteristics fall.

Therefore, the inventors engaged in in-depth studies focusing on, as explained above, keeping down the amount of addition of Nb, reducing the amount of C, and suppressing the formation of retained austenite to obtain a dual phase microstructure and as a result discovered that it is possible to obtain ferrite-martensite dual phase steel which has X60 to X70 class strength and is low in yield ratio.

Furthermore, the inventors engaged in detailed studies of a yield ratio formed by the second phases of the hard phases and, as a result, discovered that by making the cooling after hot rolling a two-stage cooling changed in cooling speed at 650° C. and making the coiling temperature after hot rolling a low temperature, it is possible to refine and harden the hard phases and possible to lower the yield ratio.

Further, the inventors engaged in studies to achieve both higher strength and lower yield ratio as explained above with good toughness and as a result discovered that by controlling the hot rolling conditions and making the ferrite grain size smaller and as a result refining the hard phases after coiling, it is possible to suppress the deterioration of toughness of steel pipe.

Based on the above, the present inventors completed the present invention. The gist is as follows:

(1) An electric resistance welded pipe comprising a base material having a chemical composition comprising, by mass %,
C: 0.05 to 0.10%,
Mn: 1.00 to 1.60%,
Ti: 0.005 to 0.030%,
Nb: 0.005% to less than 0.035%, and
N: 0.001 to 0.008%,
further comprising one or both of
Si: 0.01 to 0.60% and
Al: 0.001 to 0.10%, and
a balance of iron and unavoidable impurities,
wherein contents are restricted to
P: 0.02% or less and
S: 0.005% or less, and
a Ceq, represented by the following (formula 1), satisfies 0.23≤Ceq≤0.38, and having a metal microstructure comprising, by area ratio, 3 to 13% of martensite, and a balance of ferrite:

$$Ceq=C+Mn/6+(Cr+Mo+V)/5+(Ni+Cu)/15 \quad \text{(formula 1)}$$

where, in (formula 1), C, M, Cr, Mo, V, Ni, and Cu are values which represent the contents of the elements by mass %.

(2) The electric resistance welded pipe according to (1) wherein the chemical composition of a base material further contains, by mass %, one or more of
Ni: 1.0% or less,
Cu: 1.0% or less,
Cr: 1.0% or less,
Mo: 0.5% or less,
V: 0.2% or less,
Ca: 0.006% or less, and
REM: 0.006% or less.

(3) The electric resistance welded pipe according to (1) wherein the chemical composition of the base material satisfies
Mn: 1.00 to 1.50% and
Si: 0.40% or less and
further satisfies 0.23≤Ceq≤0.30, an average value of a equivalent circle diameter of martensite of the metal microstructure of the base material is 0.5 to 1.5 μm, and
a tensile strength of the steel pipe is 490 to 760 MPa.

(4) The electric resistance welded pipe according to (3) wherein the chemical composition of the base material satisfies
Nb: 0.005 to 0.020%.

(5) The electric resistance welded pipe according to (3) or (4) wherein the chemical composition of the base material further comprises, by mass %, one or more of
Ni: 0.5% or less,
Cu: 0.5% or less,
Cr: 0.5% or less,
Mo: 0.2% or less,
V: 0.1% or less,
Ca: 0.006% or less, and
REM: 0.006% or less.

Advantageous Effects of Invention

According to the present invention, it is possible to provide electric resistance welded pipe which has a level of strength of the X60 to X70 class (tensile strength of steel pipe of 520 MPa to 790 MPa) by the standards of the American Petroleum Institute (API), has a sufficient low temperature toughness, and can be made a yield ratio of 90% or less even as formed and a method of production of the same.

BRIEF DESCRIPTION OF DRAWINGS

FIG. 2(a) is an optical micrograph of a conventional electric resistance welded pipe with a high Nb and high C, while FIG. 2(b) is an optical micrograph examining this after Le Pera etching.

FIG. 3(a) is an optical micrograph of electric resistance welded pipe with a composition in the range of the present invention, while FIG. 3(b) is an optical micrograph examining this after Le Pera etching.

DESCRIPTION OF EMBODIMENTS

Figure 1:
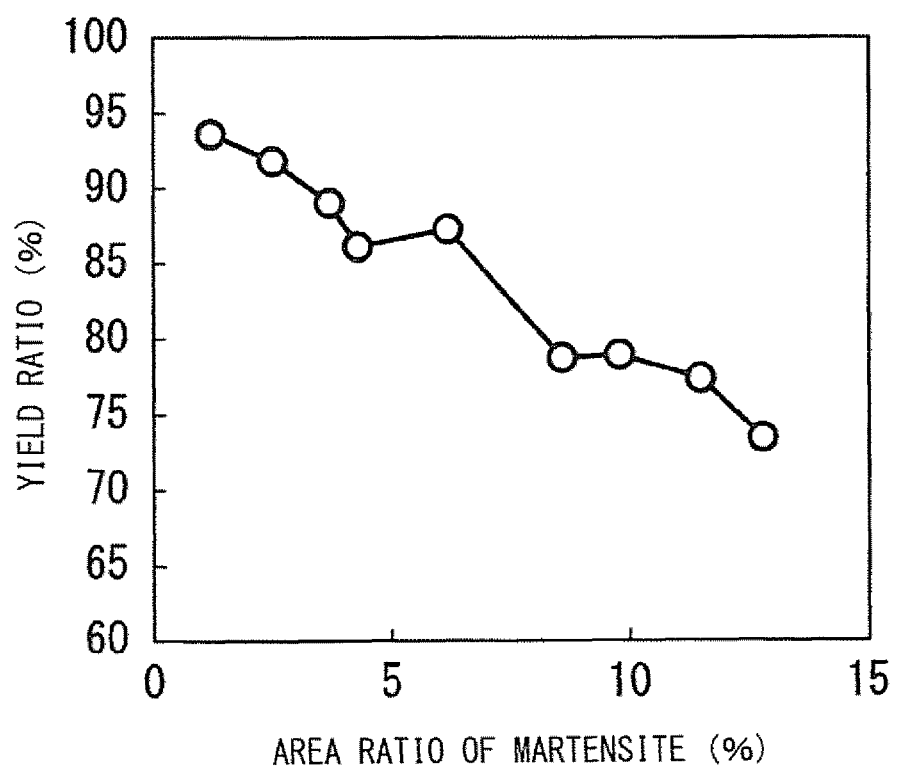
FIG. 1 is a view for explaining the relationship between the area ratio of martensite and yield ratio.

To lower the yield ratio of the electric resistance welded pipe, it is important to make the metal microstructure of the hot rolled steel plate forming the base material a dual phase microstructure comprised of soft phases and hard phases. In the present invention, the soft phases are made ferrite, while the hard phases are made martensite. Further, it is possible to lower the coiling temperature of hot rolling so as to lower the yield ratio.

FIG. 2 and FIG. 3 show metal microstructure of conventional electric resistance welded pipe and electric resistance welded pipe of the present invention. Martensite can be observed as whitened phases from an optical microscope if performing Le Pera etching. Therefore, it is possible to find the area ratio of martensite from structural photographs.

FIG. 2(a) is an optical micrograph of a conventional electric resistance welded pipe with a high Nb and high C obtained by excessively adding the amount of Nb and the amount of C, while FIG. 2(b) is an optical micrograph examining this after Le Pera etching. FIG. 3(a) is an optical micrograph of electric resistance welded pipe with a composition in the range of the present invention, while FIG. 3(b) is an optical micrograph examining this after Le Pera etching. As will be understood from a comparison of FIG. 2(b) and FIG. 3(b), in the case of conventional electric resistance welded pipe where NbC and other precipitates are utilized to increase the strength, almost no phases whitened by Le Pera etching, that is, martensite, could be observed, but in the case of the present invention of FIG. 3(b), martensite was observed.

Note that, with Le Pera etching, retained austenite also is observed as whitened phases, so X-ray diffraction was used to measure the volume ratio of retained austenite of FIG. 3(b). As a result, the volume ratio of retained austenite was 1% or less. If the volume ratio of retained austenite is 1% or less, the properties of the electric resistance welded pipe of the present invention are not affected.

The yield ratio was obtained by running a tensile test, finding YS/TS, and expressing it as a percentage. The relationship between the area ratio of martensite and yield ratio was investigated and the results shown in FIG. 1. As shown in FIG. 1, if the area ratio of martensite becomes 3% or more, the yield ratio becomes 90% or less. Furthermore, if the area ratio of martensite becomes 8% or more, the yield ratio rapidly falls and the yield ratio can be reduced to 80% or less.

Below, the electric resistance welded pipe of the present invention and the method of production of the same will be explained in detail.

First, the chemical composition of the base material of the electric resistance welded pipe of the present invention will be explained. The chemical composition of the material of the electric resistance welded pipe, that is, the hot rolled steel plate, are the same as the chemical composition of the base material of the electric resistance welded pipe. Below, "%" indicates "mass %".

C: 0.05 to 0.10%

C is a useful element for raising the strength of the steel. It makes the martensite increase to harden the steel and contributes to a drop in the yield ratio, so the lower limit is made 0.05%. If the amount of C exceeds 0.10%, the field weldability deteriorates, the area ratio of martensite increases, the strength becomes too high, and the toughness deteriorates, so the upper limit was made 0.10%. From the viewpoint of securing the strength, the amount of C is preferably made 0.06% or more. From the viewpoint of making the strength excessively rise and securing the toughness, the amount of C is preferably made 0.08% or less.

Mn: 1.00 to 1.60%

Mn is an element which increases the hardenability of the steel and contributes to the formation of martensite. In the present invention, to secure the strength, 1.00% or more of Mn is added. If excessively adding Mn, the area ratio of martensite increases and the toughness deteriorates, so the upper limit is made 1.60%. From the viewpoint of securing strength, the amount of Mn is preferably made 1.10% or more, while 1.20% or more is more preferable. From the viewpoint of toughness, the amount of Mn is preferably made 1.50% or less, while 1.40% or less is more preferable.

Ti: 0.005 to 0.030%

Ti is an element which forms carbonitrides and contributes to refinement of the microstructure and improvement of the toughness. The present invention uses thick steel plate. To secure low temperature toughness of thick steel plate, 0.005% or more of Ti must be added. If excessively adding Ti, coarsening of TiN and precipitation hardening by TiC occur, the toughness deteriorates, and the yield ratio rises, so 0.030% is made the upper limit. From the viewpoint of refining the microstructure to secure the toughness, the amount of Ti is preferably made 0.008% or more, while 0.010% or more is more preferable. From the viewpoint of suppressing the drop in yield ratio due to the precipitates, the amount of Ti is preferably 0.025% or less, while 0.020% or less is more preferable.

Nb: 0.005% to less than 0.035%

Nb is an element which lowers the recrystallization temperature and, when hot rolling, suppresses the recrystallization of austenite and contributes to refinement of the microstructure, so 0.005% or more is added. If excessively adding Nb, excessive precipitation strengthening causes the yield strength to rise and the yield ratio to become higher, so the content is made less than 0.035%. From the viewpoint of lowering the yield ratio, the amount of Nb is more preferably made 0.025% or less, more preferably 0.020% or less.

N: 0.001 to 0.008%

N is an element which forms nitrides, in particular TiN, and contributes to refinement of the microstructure and is included in 0.001% or more. To refine the microstructure, inclusion of 0.002% or more of N is preferable. More preferably, the content is made 0.003% or more. If the amount of N becomes excessive, coarse nitrides are formed and the toughness is impaired, so the upper limit is made 0.008%. The upper limit of the amount of N is preferably 0.007%, more preferably 0.006%.

In the present invention, one or both of Si and Al are used as deoxidizing elements.

Si: 0.60% or Less

Si is effective as a deoxidizing agent. When Al is added, addition is not essential. To obtain the effect as a deoxidizing agent, addition of 0.01% or more is preferable. Further, Si is an element which uses solution strengthening to raise the strength, so addition of 0.05% or more is more preferable, while addition of 0.10% or more is still more preferable. If adding Si over 0.60%, the ductility and toughness and, furthermore, the seam welding ability are impaired, so the upper limit is made 0.60%. From the viewpoint of securing the toughness, the amount of Si is preferably made 0.40% or less, more preferably 0.30% or less.

Al: 0.10% or Less

Al is effective as a deoxidizing agent. When Si is added, addition is not essential. To obtain the effect as a deoxidizing agent, addition of 0.001% or more is preferable. To improve the effect of deoxidation, addition of 0.005% or more of Al is preferable, while addition of 0.01% or more is more preferable. If adding Al over 0.10%, the inclusions increase and the ductility and toughness are impaired, so the content is limited to 0.10%. From the viewpoint of securing the toughness, the amount of Al is preferably made 0.05% or less, more preferably 0.03% or less.

In the present invention, the contents of the impurities P and S are limited. P and S are not deliberately added elements. The P and S which are contained in the raw materials enter as contaminants, but if the contents become larger, it is not preferable, so the contents are restricted as follows.

P: 0.02% or Less

P is an impurity. The upper limit of content is made 0.02%. Due to the reduction of the amount of P, grain boundary fracture is prevented and the toughness is improved, so the amount of P is preferably 0.015% or less, more preferably 0.010% or less. The amount of P is preferably small, so no lower limit is provided. From the balance of properties and cost, usually 0.001% or more is included.

S: 0.005% or Less

S is an impurity. The upper limit of content is made 0.005%. Due to the reduction of the amount of S, the MnS which is stretched by the hot rolling can be reduced and the toughness can be improved, so the amount of S is preferably 0.003% or less, more preferably 0.002% or less. The amount of S is preferably small, so no lower limit is provided. From the balance of properties and cost, usually 0.0001% or more is included.

Ceq: 0.23 to 0.38

The carbon equivalent Ceq is an indicator of the hardenability and is sometimes also used as an indicator of strength. It is found by the following (formula 1) from the contents (mass %) of C, Mn, Cr, Mo, V, Ni, and Cu. To secure the strength, Ceq has to be made 0.23 or more. To secure the toughness, Ceq has to be made 0.38 or less. The lower limit of Ceq is preferably 0.25 or more. The upper limit of Ceq is preferably 0.35 or less, more preferably 0.30 or less.

$$Ceq=C+Mn/6+(Cr+Mo+V)/5+(Ni+Cu)/15 \qquad \text{(formula 1)}$$

Here, C, Mn, Cr, Mo, V, Ni, and Cu are the contents (mass %) of the respective elements. Note that, Cr, Mo, V, Ni, and Cu, as explained later, are elements which are selectively added in the present invention. When not deliberately added, they are calculated as 0 in the above (formula 1).

In the present invention, furthermore, to improve the hardenability of steel and raise the strength, one or more of Ni, Cu, Cr, Mo, and V can be added. Further, to raise the toughness of the steel pipe and electric resistance welded zone, one or more of Ca and REM can be added. These elements are elements which are optionally added. They are not essential added elements, so no lower limits of content are prescribed. In the following description, preferable lower limit values are described, but these are preferable lower limit values for improving the hardenability due to addition of elements or for obtaining the effect of raising the strength. Even if the contents of the elements are less than the preferable lower limit values, the steel is not detrimentally affected.

Ni: 1.0% or Less

Ni is an element which improves the hardenability of steel and contributes to improvement of the toughness. To improve the strength, the amount of Ni is preferably made 0.05% or more. Further, Ni is an expensive element, so the upper limit is made 1.0%, while 0.5% or less is more preferable and 0.3% or less is still more preferable.

Cu: 1.0% or Less

Cu is an element which improves the hardenability of steel and contributes to solution strengthening as well, so addition of 0.05% or more is preferable. If excessively adding Cu, the surface properties of the steel plate are sometimes impaired, so the upper limit is made 1.0% or less. From the viewpoint of economy, the more preferable upper limit of the amount of Cu is 0.5%, while 0.3% or less is more preferable. When adding Cu, from the viewpoint of preventing deterioration of the surface properties, it is preferable to simultaneously add Ni.

Cr: 1.0% or Less

Cr is an element which is effective for improvement of strength. 0.05% or more is preferably added. If excessively adding Cr, when making the end parts of the steel pipe abut for welding (field welding), the weldability sometimes deteriorates, so 1.0% is made the upper limit. More preferably it is 0.5% or less, still more preferably 0.2% or less.

Mo: 0.50% or Less

Mo is an element which contributes to increasing the strength of steel. 0.05% or more is preferably added. However, Mo is an expensive element. 0.5% is made the upper limit. The more preferable upper limit of the amount of Mo is 0.3% or less, more preferably 0.1% or less.

V: 0.2% or Less

V is an element which forms carbides and nitrides and improves the strength of steel by precipitation strengthening. To effectively make the strength rise, it is preferable to add 0.01% or more. If excessively adding V, the carbides and nitrides coarsen and the yield ratio sometimes rises, so the upper limit of the amount of V is made 0.2%. From the viewpoint of lowering the yield ratio, the lower limit of the amount of V is more preferably made 0.1% or less, still more preferably 0.05% or less.

Ca: 0.006% or Less and REM: 0.006% or Less

Ca and REM control the form of the sulfide-based inclusions, improve the low temperature toughness, and further refine the oxides of the electric resistance welded zone to improve the toughness of the electric resistance welded zone, so one or both are preferably added to 0.001% or more. If excessively adding Ca and REM, the oxides and sulfides become larger and the toughness is detrimentally affected, so the upper limit of the amount of addition is made 0.006%. Here, REM is the overall name for Sc, Y, La, Ce, Pr, Nd, Pm, Sm, Eu, Gd, Tb, Dy, Ho, Er, Tm, Yb, and Lu.

The balance of the chemical composition of the base material of the electric resistance welded pipe according to the present invention other than those explained above is comprised of iron and unavoidable impurities. The "unavoidable impurities" are components which are included in the raw materials or enter in the process of production and are not deliberately included in the steel.

Specifically, P, S, O, Sb, Sn, W, Co, As, Mg, Pb, Bi, B, and H may be mentioned. Among these, P and S, as explained above, have to be controlled to respectively 0.02% or less and 0.005% or less. O is preferably controlled to 0.006% or less.

Regarding the other elements, usually Sb, Sn, W, Co, and As may be included in 0.1% or less, Mg, Pb and Bi in 0.005% or less, and B and H in 0.0005% or less as unavoidable impurities, but these do not particularly have to be controlled so long as in the normal ranges.

Further, the selectively or optionally added elements in the steel pipe of the present invention of Si, Al, Ni, Cu, Cr, Mo, V, Ca, and REM may also be mixed in as unavoidable impurities even without being deliberately included, but so long as below the upper limit of content in the case of deliberate inclusion, the steel pipe of the present invention is not detrimentally affected, so there is no problem. Further, N is generally treated as an unavoidable impurity in steel, but in the electric resistance welded pipe of the present invention, as explained above, control to within a certain range is necessary.

Next, the metal microstructure of the base material of the electric resistance welded pipe of the present invention will be explained. The metal microstructure of the base material of the electric resistance welded pipe of the present invention is made a dual phase microstructure of martensite and a balance of ferrite. The area ratio of martensite is made 3% or more so as to lower the yield ratio. The area ratio of the martensite is preferably 5% or more, more preferably 8% or more. If the martensite increases, the toughness falls, so the upper limit of the area ratio of the martensite is made 13%. The area ratio of the martensite is preferably 12% or less, more preferably 10% or less.

The area ratio of the martensite is found by an optical microscope after Le Pera etching. If the retained austenite increases, the martensite falls in hardness and the yield ratio rises. For this reason, in the present invention, X-ray diffraction is used to measure the volume ratio of the retained austenite. If the volume ratio of the retained austenite is 1% or less, it is judged that the metal microstructure is a dual phase microstructure comprised of martensite and ferrite.

The martensite is preferably dispersed in the ferrite with an average value of equivalent circle diameters of 0.5 to 1.5 µm. If the martensite is dispersed with an average value of equivalent circle diameters of less than 0.5 µm, it no longer contributes to a reduction in the yield ratio. If the martensite is dispersed with an average value of equivalent circle diameters exceeding 1.5 µm, the low temperature toughness is impaired. The martensite more preferably is dispersed with an average value of equivalent circle diameters of 0.7 to 1.1 µm. The more preferable state of dispersion of martensite is one with a maximum value of equivalent circle diameter of 7 µm or less, more preferably 5 µm or less, and a standard deviation of 1 µm or less, more preferably 0.8 µm or less.

Next, the method of production of the electric resistance welded pipe of the present invention will be explained. First, the production conditions for the material of the electric resistance welded pipe of the present invention of the hot rolled steel plate will be explained.

In the present invention, steel having the above composition is smelted, then cast to form a slab. The slab is heated and hot rolled, then is cooled by controlled cooling, coiled, and air-cooled to produce hot rolled steel plate.

The heating temperature of the steel slab is 1150° C. or more so as to make the Nb and other carbide-forming elements form solid solutions in the steel. If the heating temperature is too high, the microstructure becomes coarse, so to prevent coarsening of the grain size of the ferrite, 1250° C. or less is preferable.

Hot rolling has to be performed in the temperature range where the microstructure of the steel is an austenite phase. This is because if rolling after the ferrite transformation starts, deformed ferrite is produced and the anisotropy of the mechanical properties becomes greater. Therefore, the finishing temperature of the hot rolling is preferably at least $Ar_3$ where the ferrite transformation starts at the time of cooling. If the finishing temperature is too high, the microstructure becomes coarse, so $Ar_3+50°$ C. or less is preferable.

$Ar_3$ can be found from the heat expansion behavior when using a test material of the same composition as the base material steel plate for heating and cooling. Further, it can also be found from the composition of the base material steel plate by the following (formula 2):

$$Ar_3(° C.)=910-3100-80Mn-55Ni-20Cu-15Cr-80Mo \quad \text{(formula 2)}$$

Here, C, Mn, Ni, Cu, Cr, and Mo are the contents (mass %) of the respective elements. Ni, Cu, Cr, and Mo are elements which are optionally added in the present invention. When not deliberately adding these elements, they are calculated as 0 in the above (formula 2).

In hot rolling, to make the ferrite microstructure of the steel finer, it is preferable to make the rolling reduction at 950° C. or less 70% or more. Depending on the thickness of the steel slab, hot rolling may be performed at over 950° C., but to promote ferrite transformation, it is preferable to increase the rolling reduction at 950° C. or less and build up the strain. The amount of rolling reduction at 950° C. or less is the difference between the plate thickness at 950° C. and the plate thickness after the final rolling divided by plate thickness after the final rolling expressed as a percentage.

To form martensite after hot rolling, accelerated cooling is performed at 750° C. or more, preferably the $Ar_3$ temperature or more. If the temperature falls too much after hot rolling, coarse polygonal ferrite is formed and the strength falls or the toughness sometimes deteriorates.

The accelerated cooling is made two-stage cooling with average cooling in the first stage down to 650° C. of 10 to 25° C./s and with the average cooling speed in the second stage from 650° C. down until stopping accelerated cooling of 20 to 50° C./s. The cooling speed in the second stage is made 1.5 times or more the cooling speed in the first stage, preferably 2 times or more.

The above such two-stage cooling is performed to form ferrite by the first stage cooling and raise the cooling speed in the second stage so as to form martensite without forming pearlite and further without forming austenite so as to obtain a dual phase microstructure of ferrite and martensite.

The stop temperature of the accelerated cooling is made 300° C. or less or sufficiently lower than the Ms temperature. The steel is coiled up to produce hot rolled steel strip to thereby form hard martensite and lower the yield ratio. If the stop temperature of accelerated cooling exceeds 100° C., the area ratio of martensite becomes insufficient or the austenite excessively remains and the yield ratio does not sufficiently fall.

Next, in the present invention, the obtained hot rolled steel strip is air cooled and cold worked into a tubular shape. The end parts are made to abut against each other and seam welded to produce electric resistance welded pipe. The present invention is an invention which envisions electric resistance welded pipe which is thick and small in outside diameter. While not particularly limited, the ratio t/D of the thickness "t" of the base material and the outside diameter D of the electric resistance welded pipe is 2.0 to 6.0% or so. It is also possible to realize electric resistance welded pipe with a "t" of 12.5 mm or more and a t/D of 5.0% or more which is sought for pipelines which are laid in deep seas.

Furthermore, it is also possible to heat only the electric resistance welded zone and cool it by accelerated cooling for seam heat treatment. With seam welding, the abutting parts are heated to make them melt and pressure is applied to join them by a solid phase, so the vicinity of the electric resistance welded zone plastically deforms at a high temperature, then is rapidly cooled. For this reason, the electric resistance welded zone becomes harder compared with the base material. By heat treating the seam, the electric resistance welded pipe can be further improved in low temperature toughness and deformation performance.

EXAMPLES

Below, the effects of the present invention will be more specifically explained by examples. Note that, the present invention is not limited to the conditions which are used in the following examples. Note that, in Tables 1 to 3, the underlines indicate outside the range of the present invention. Further, in the tables, the empty fields show the elements are not deliberately added. The steels AA to AG are steels which do not satisfy the requirements of the chemical composition of the present invention.

Steels which have the chemical composition which are shown in Table 1 were cast to obtain steel slabs. These steel slabs were heated to the heating temperatures which are shown in Table 2, were hot rolled by rolling finishing temperatures (in Table 2, FT) of the $Ar_3$ temperature or more, and cooled by accelerated cooling to obtain base material steel plates. The accelerated cooling was made two-stage cooling changed in cooling speed at 650° C. with the average cooling speed of the second stage (650° C. or less) becoming about 2 times the average cooling speed of the first stage (down to 650° C.) The steel plates after accelerated cooling were coiled at the coiling temperatures described in Table 2 (CT) to obtain hot rolled steel strips.

Next, the obtained hot rolled strips were air cooled, then were formed into tubular shapes by a continuous roll forming process, then the end parts of the hot rolled strips were made to abut against each other and were welded by seam welding. After this, in accordance with need, the electric resistance welded zones were heated, then cooled by accelerated cooling to heat treat the seam.

In Table 2, "rolling reduction" is the rolling reduction in the hot rolling step at 950° C. or less and is found as the difference between the plate thickness at 950° C. and the plate thickness after final rolling divided by the plate thickness after final rolling expressed as a percentage. Further, "t" is the thickness of the steel plate, while "D" is the outside diameter of the steel pipe after pipemaking.

In Table 1, $Ar_3$ was found from the contents (mass %) of the C, Mn, Ni, Cu, Cr, and Mo which are shown in Table 1. Note that, Ni, Cu, Cr, and Mo are optionally added elements in the present invention. When not deliberately added, as shown by the blank fields in Table 1, in the following (formula 2), they are calculated as 0.

$$Ar_3(°C.)=910-310C-80Mn-55Ni-20Cu-15Cr-80Mo \quad \text{(formula 2)}$$

Next, from the base material parts of the obtained electric resistance welded pipes, samples for examination of the microstructure were taken. The cross-sections parallel to the steel pipe longitudinal directions were etched by Nital, then were examined for microstructure and photographed by an optical microscope. The observation positions were made the t/4 positions from the outer surfaces. These structural photographs were used to confirm that pearlite, bainite, and other microstructures other than ferrite and martensite were not formed. After that, Le Pera etching was performed, optical micrographs were taken at the 0.4 t positions, and image analysis was used to find the area ratios of the martensite. Furthermore, image analysis was used to measure the equivalent circle diameters of the martensite. The area ratios and equivalent circle diameters of the martensite were measured at 10 fields of 100 μm×200 μm and the average values were found. Furthermore, the X-ray diffraction method was used to measure the volume ratios of austenite. These were confirmed to be 1% or less.

Next, from the base materials of the electric resistance welded pipes, based on JIS Z 2241, arc-shaped tensile test pieces were taken in the steel pipe longitudinal direction, tensile tests were run at room temperature, and the yield stresses and the tensile strengths were found. Further, from the base materials of the electric resistance welded pipes, based on JIS Z 2242, V-notch test pieces were taken, Charpy tests were run at −30° C., the Charpy absorption energies $vE_{-30}$ were found, and the toughnesses were evaluated. Note that, the V-notch test pieces were taken using the circumferential direction as the longitudinal directions. When full-sized test pieces of a thickness of 10 mm could not be taken, sub-sized test pieces were used and the values were converted to a thickness of 10 mm. The results are shown in Table 3.

TABLE 1

| Steel | C | Mn | Ti | Nb | N | Si | Al | P | S | Ni | Cu | Cr | Mo | V | Ca | REM | Ceq | Ar3 |
|---|---|---|---|---|---|---|---|---|---|---|---|---|---|---|---|---|---|---|
| A | 0.051 | 1.49 | 0.011 | 0.034 | 0.0022 | 0.39 | | 0.018 | 0.0027 | | | | | | 0.0015 | | 0.30 | 775 |
| B | 0.061 | 1.26 | 0.015 | 0.016 | 0.0031 | 0.22 | 0.032 | 0.004 | 0.0031 | | 0.13 | | | | 0.0024 | | 0.30 | 788 |
| C | 0.076 | 1.15 | 0.022 | 0.011 | 0.0055 | 0.12 | 0.028 | 0.007 | 0.0045 | | | 0.15 | | | | | 0.30 | 782 |
| D | 0.088 | 1.26 | 0.018 | 0.024 | 0.0045 | | 0.018 | 0.015 | 0.0008 | | | | | | 0.0038 | | 0.30 | 782 |
| E | 0.099 | 1.01 | 0.008 | 0.005 | 0.0018 | 0.16 | 0.022 | 0.011 | 0.0013 | 0.10 | 0.10 | | | 0.05 | | | 0.29 | 791 |
| F | 0.062 | 1.24 | 0.013 | 0.015 | 0.0030 | 0.19 | 0.034 | 0.004 | 0.0016 | | | | | | 0.0024 | | 0.27 | 792 |
| G | 0.060 | 1.55 | 0.019 | 0.030 | 0.0080 | 0.18 | 0.060 | 0.007 | 0.0010 | | | | | | | | 0.32 | 767 |
| H | 0.060 | 1.60 | 0.017 | 0.006 | 0.0040 | 0.56 | 0.030 | 0.014 | 0.0030 | 0.20 | | | | | | 0.0021 | 0.34 | 752 |
| I | 0.100 | 1.60 | 0.008 | 0.031 | 0.0050 | 0.25 | 0.030 | 0.015 | 0.0020 | | | | | | | | 0.37 | 751 |
| J | 0.050 | 1.40 | 0.008 | 0.023 | 0.0050 | 0.34 | 0.030 | 0.015 | 0.0050 | | | | | | | | 0.28 | 783 |
| AA | <u>0.040</u> | 1.60 | 0.009 | 0.029 | 0.0030 | 0.34 | 0.030 | 0.015 | 0.0030 | | | | | | | | 0.31 | 770 |
| AB | <u>0.110</u> | 1.40 | 0.012 | 0.008 | 0.0010 | 0.34 | 0.030 | 0.008 | 0.0020 | 0.10 | 0.10 | | | | | | 0.36 | 756 |
| AC | 0.080 | <u>1.80</u> | 0.024 | 0.006 | 0.0050 | 0.34 | 0.030 | 0.008 | 0.0050 | | | | | | | | 0.38 | 741 |
| AD | 0.080 | <u>0.90</u> | 0.008 | 0.013 | 0.0070 | 0.34 | 0.030 | 0.008 | 0.0030 | | | | | | | | 0.23 | 813 |
| AE | 0.100 | 1.60 | 0.030 | 0.030 | 0.0020 | 0.23 | 0.030 | 0.008 | 0.0010 | 0.10 | 0.10 | 0.10 | | | | | <u>0.40</u> | 742 |
| AF | 0.050 | 1.00 | 0.018 | 0.010 | 0.0020 | 0.54 | 0.030 | 0.008 | 0.0010 | | | | | | | | <u>0.22</u> | 815 |
| AG | 0.064 | 1.35 | <u>0.001</u> | <u>0.045</u> | 0.0035 | 0.18 | 0.024 | 0.012 | 0.0021 | | | | | | 0.0031 | | 0.29 | 782 |

TABLE 2

| No. | Steel | Heating temp. (° C.) | Rolling reduction (%) | t (mm) | FT (° C.) | Water cooling start temperature (° C.) | Average cooling speed down to 650° C. (° C./s) | Average cooling speed at 650° C. and less (° C./s) | CT (° C.) | D (mm) | t/D | |
|---|---|---|---|---|---|---|---|---|---|---|---|---|
| 1 | A | 1240 | 75 | 12.7 | 820 | 800 | 12 | 25 | <100 | 280 | 4.5 | Inv. |
| 2 | B | 1200 | 75 | 17.9 | 810 | 790 | 18 | 35 | <100 | 300 | 6.0 | ex. |
| 3 | C | 1200 | 80 | 15.8 | 805 | 795 | 12 | 35 | <100 | 300 | 5.3 | |
| 4 | D | 1200 | 80 | 14.3 | 810 | 795 | 12 | 40 | <100 | 250 | 5.7 | |
| 5 | E | 1150 | 85 | 17.8 | 820 | 800 | 18 | 40 | <100 | 280 | 6.4 | |
| 6 | F | 1200 | 75 | 12.7 | 820 | 800 | 12 | 24 | <100 | 324 | 3.9 | |
| 7 | F | 1200 | 85 | 7.9 | 810 | 790 | 18 | 35 | <100 | 330 | 2.4 | |
| 8 | F | 1200 | 60 | 12.7 | 800 | 780 | 12 | 30 | <100 | 324 | 3.9 | |
| 9 | F | 1200 | 75 | 12.7 | 810 | 790 | 10 | 20 | 180 | 324 | 3.9 | |
| 10 | G | 1150 | 53 | 15.2 | 830 | 822 | 15 | 30 | 230 | 254 | 6.0 | |
| 11 | G | 1150 | 60 | 18.3 | 805 | 790 | 12 | 25 | <100 | 305 | 6.0 | |
| 12 | H | 1150 | 61 | 10.2 | 890 | 871 | 10 | 18 | 190 | 406 | 2.5 | |
| 13 | H | 1150 | 65 | 10.2 | 810 | 795 | 15 | 25 | <100 | 406 | 2.5 | |
| 21 | <u>AA</u> | 1240 | 81 | 12.7 | 880 | 868 | 10 | 35 | <100 | 212 | 6.0 | Comp. |
| 22 | <u>AB</u> | 1150 | 73 | 12.7 | 880 | 840 | 8 | 25 | <100 | 249 | 5.1 | ex. |
| 23 | <u>AC</u> | 1240 | 52 | 12.7 | 890 | 856 | 12 | 25 | 130 | 249 | 5.1 | |
| 24 | <u>AD</u> | 1150 | 78 | 12.7 | 860 | 819 | 12 | 30 | <100 | 249 | 5.1 | |
| 25 | <u>AE</u> | 1240 | 52 | 15.3 | 880 | 863 | 14 | 20 | <100 | 300 | 5.1 | |
| 26 | <u>AF</u> | 1150 | 52 | 15.3 | 890 | 852 | 20 | 20 | <100 | 300 | 5.1 | |
| 27 | <u>AG</u> | 1240 | 52 | 15.3 | 870 | 850 | 14 | 20 | <100 | 300 | 5.1 | |
| 28 | I | 1240 | 54 | 15.3 | 880 | 836 | 15 | 15 | <100 | 255 | 6.0 | |
| 29 | J | 1150 | 65 | 15.3 | 810 | 803 | 15 | 25 | 450 | 478 | 3.2 | |

TABLE 3

| No. | Martensite area ratio (%) | Martensite average equivalent circle diameter | YS (MPa) | TS (MPa) | YR (%) | vE-30 (J) | |
|---|---|---|---|---|---|---|---|
| 1 | 3.2 | 0.50 | 455 | 585 | 77.8 | 330 | Inv. |
| 2 | 5.8 | 0.85 | 543 | 624 | 87.0 | 230 | ex. |
| 3 | 7.8 | 1.10 | 513 | 632 | 81.2 | 220 | |
| 4 | 11.2 | 1.30 | 544 | 644 | 84.5 | 210 | |
| 5 | 12.8 | 1.90 | 565 | 655 | 86.3 | 190 | |
| 6 | 5.2 | 1.00 | 485 | 564 | 86.0 | 230 | |
| 7 | 5.9 | 0.70 | 527 | 615 | 85.7 | 190 | |
| 8 | 6.3 | 0.95 | 490 | 577 | 84.9 | 211 | |
| 9 | 6.6 | 1.35 | 426 | 520 | 82.0 | 195 | |
| 10 | 7.7 | 1.15 | 491 | 606 | 81.0 | 301 | |
| 11 | 7.1 | 0.90 | 628 | 728 | 86.3 | 233 | |
| 12 | 8.5 | 1.25 | 483 | 571 | 85.0 | 281 | |
| 13 | 10.5 | 1.15 | 475 | 748 | 63.5 | 195 | |
| 21 | 1.2 | 0.51 | 500 | 537 | 93.1 | 297 | Comp. |
| 22 | 13.2 | 2.34 | 630 | 750 | 84.0 | 165 | ex. |
| 23 | 13.5 | 1.31 | 604 | 737 | 82.0 | 175 | |
| 24 | 7.0 | 1.33 | 405 | 471 | 86.0 | 315 | |
| 25 | 13.2 | 1.0 | 640 | 720 | 88.9 | 195 | |
| 26 | 5.1 | 0.93 | 400 | 450 | 88.9 | 340 | |
| 27 | 3.1 | 1.7 | 485 | 533 | 91.0 | 180 | |
| 28 | 0 | 0 | 495 | 545 | 90.8 | 330 | |
| 29 | 0 | 0 | 500 | 547 | 91.4 | 362 | |

As shown in Table 3, the invention examples are all metal microstructures comprised of suitable area ratios of martensite and ferrite. The tensile strengths of the electric resistance welded pipes were all X56 or higher (tensile strength 490 MPa or more), while the yield ratios were all good 90% or less. Further, all of the invention examples exhibited 190J or more high Charpy absorption energies even at −30° C. The toughnesses were also good.

No. 21 is an example where the amount of C is small, so the strength falls, martensite is insufficiently formed, and the yield ratio rises. No. 22 is an example where the amount of C is large, while No. 23 is an example where the amount of Mn is large, martensite is excessively formed, and the toughness falls. No. 24 is an example where the amount of Mn is small, so the strength falls.

No. 25 is an example where the Ceq is too high, martensite is excessively formed, and the toughness falls. No. 26 is an example where Ceq is too low and the toughness falls. No. 27 is an example where the amount of Ti is small, so the toughness falls and, further, the amount of Nb is large, so in addition to ferrite, bainite is formed and the yield ratio rises.

No. 28 is an example where the cooling speed at 650° C. or less is slow, so martensite is not formed and the yield ratio rises. On the other hand, No. 29 is an example where the accelerated cooling speed is a high 450° C., martensite is not formed, and the yield ratio rises.

INDUSTRIAL APPLICABILITY

According to the present invention, it is possible to provide electric resistance welded pipe which has an X60 to 70 class strength, has sufficient low temperature toughness, and has a low yield ratio which can be used for pipelines which are laid at the deep seas etc., so is great in industrial applicability.

The invention claimed is:

1. An electric resistance welded pipe comprising a base material having a chemical composition comprising, by mass %,
C: 0.05 to 0.10%,
Mn: 1.00 to 1.60%,
Ti: 0.005 to 0.030%,
Nb: 0.005% to less than 0.035%, and
N: 0.001 to 0.008%,
further comprising one or both of
Si: 0.01 to 0.60% and
Al: 0.001 to 0.10%, and
a balance of iron and unavoidable impurities, wherein contents are restricted to
P: 0.02% or less and
S: 0.005% or less, and
a Ceq, represented by the following formula 1, satisfies 0.23≤Ceq≤0.38, and having a metal microstructure comprising, by area ratio, 3 to 13% of martensite, and a balance of ferrite, an average value of an equivalent circle diameter of the martensite being 0.5 to 1.5 μm:

$$Ceq=C+Mn/6+(Cr+Mo+V)/5+(Ni+Cu)/15 \quad \text{(formula 1)}$$

where, in formula 1, C, M, Cr, Mo, V, Ni, and Cu are values which represent the contents of the elements by mass %.

2. The electric resistance welded pipe according to claim 1 wherein the chemical composition of the base material further comprises, by mass %, one or more of
Ni: 1.0% or less,
Cu: 1.0% or less,
Cr: 1.0% or less,
Mo: 0.5% or less,
V: 0.2% or less,
Ca: 0.006% or less, and
REM: 0.006% or less.

3. The electric resistance welded pipe according to claim 1 wherein the chemical composition of the base material satisfies
Mn: 1.00 to 1.50% and
Si: 0.40% or less and
further satisfies
0.23≤Ceq≤0.30,
and
a tensile strength of the steel pipe is 490 to 760 MPa.

4. The electric resistance welded pipe according to claim 3 wherein the chemical composition of the base material satisfies
Nb: 0.005 to 0.020%.

5. The electric resistance welded pipe according to claim 3 wherein the chemical composition of the base material further comprises, by mass %, one more of
Ni: 0.5% or less,
Cu: 0.5% or less,
Cr: 0.5% or less,
Mo: 0.2% or less,
V: 0.1% or less,
Ca: 0.006% or less, and
REM: 0.006% or less.

6. The electric resistance welded pipe according to claim 4 wherein the chemical composition of the base material further comprises, by mass %, one more of
Ni: 0.5% or less,
Cu: 0.5% or less,
Cr: 0.5% or less,
Mo: 0.2% or less,
V: 0.1% or less,
Ca: 0.006% or less, and
REM: 0.006% or less.

7. The electric resistance welded pipe according to claim 1, wherein the electric resistance weld pipe has a Charpy absorption energy at −30° C. of 190 J or more.

8. The electric resistance welded pipe according to claim 2, wherein the electric resistance weld pipe has a Charpy absorption energy at −30° C. of 190 J or more.

9. The electric resistance welded pipe according to claim 3, wherein the electric resistance weld pipe has a Charpy absorption energy at −30° C. of 190 J or more.

10. The electric resistance welded pipe according to claim 4, wherein the electric resistance weld pipe has a Charpy absorption energy at −30° C. of 190 J or more.

11. The electric resistance welded pipe according to claim 5, wherein the electric resistance weld pipe has a Charpy absorption energy at −30° C. of 190 J or more.

12. The electric resistance welded pipe according to claim 6, wherein the electric resistance weld pipe has a Charpy absorption energy at −30° C. of 190 J or more.

* * * * *